United States Patent [19]

Schaefer et al.

[11] Patent Number: 5,826,268
[45] Date of Patent: Oct. 20, 1998

[54] SECURE MULTILEVEL OBJECT ORIENTED DATABASE MANAGEMENT SYSTEM

[75] Inventors: Marvin Schaefer, Glenwood, Md.; Paul A. Martel, Fitchburg; Antoun J. Kanawati, Arlington, both of Mass.; Sandra A. Wade, Rockville, Md.

[73] Assignee: Ontos, Inc., Lowell, Mass.

[21] Appl. No.: 772,315

[22] Filed: Dec. 23, 1996

Related U.S. Application Data

[60] Provisional application No. 60/015,322, Apr. 12, 1996.

[51] Int. Cl.[6] .................................................. G06F 17/00
[52] U.S. Cl. ...................... 707/9; 707/6; 707/8; 707/201
[58] Field of Search .......................... 707/1–10, 100–104, 707/200–206; 370/338, 349, 346, 440, 455, 463

[56] References Cited

U.S. PATENT DOCUMENTS

| | | | |
|---|---|---|---|
| 5,481,700 | 1/1996 | Thurasingham | 395/600 |
| 5,640,552 | 6/1997 | Yianilos | 395/605 |
| 5,652,882 | 7/1997 | Doktor | 395/617 |
| 5,694,590 | 12/1997 | Thurasingham et al. | 395/600 |

*Primary Examiner*—Thomas G. Black
*Assistant Examiner*—David Jung
*Attorney, Agent, or Firm*—Weingarten, Schurgin, Gagnebin & Hayes LLP

[57] ABSTRACT

A secure multilevel object oriented database management system which maintains data confidentiality and optimizes data integrity. All requests for database operations are mediated through an access validation monitor (AVM). The AVM is responsible for performing the following duties: applying mandatory and discretionary access control rules for each request it services to ensure the request is allowable; constructing views of multilevel objects ensuring that the clearance level of the subject making the request dominates the classification of the data being requested; managing data update requests so as to allow polyinstantiation only upon receiving explicit requests from the subject, the explicit request being accomplished through an update to the associated semantic vector (Semantic vectors are employed to maintain data integrity); detecting erroneous polyinstantiation attempts and flagging such errors to the requesting subject; and managing the creation of new multilevel objects, and enforces entity integrity constraints. The AVM constructs the requesting subject's view of a multilevel object at a particular security level by computing a value for each property of the object. Each property value of the object if determined by inspecting the object's semantic vector. The semantic vector indicates, for each property of a multilevel object and at every populated level of said object, whether the property's value is dynamic (i.e., derived from an instantiation stored at the nearest populated dominated sensitivity level of the object where the semantic vector mark such property static).

21 Claims, 5 Drawing Sheets

| property t.p | $p_1$ | $p_2$ | $p_3$ | $p_4$ | $p_5$ | $p_6$ | $p_7$ | $p_8$ | $p_9$ |
|---|---|---|---|---|---|---|---|---|---|
| vl(t.p) | U | U | U | C | C | S | S | T | T |
| TS | $p_1.v^1$ | ⇓ | ⇓ | ⇓ | ⇓ | ⇓ | ⇓ | $p_8.v$ | $dv(t.p_9)$ |
| S | ⇓ | ⇓ | ⇓ | $p_4.v$ | $p_5.v^1$ | $p_6.v$ | $p_7.v$ | ∅ | ∅ |
| C | ⇓ | ⇓ | $p_3.v$ | $dv(t.p_4)$ | $p_5.v$ | ∅ | ∅ | ∅ | ∅ |
| U | $p_1.v$ | $p_2.v$ | $dv(t.p_3)$ | ∅ | ∅ | ∅ | ∅ | ∅ | ∅ |

40 U-view of list shown below: note that the reference from B to C at level U results in reaching a tombstone 50, which results in a runtime error (NoSuchRef exception).

40 TS-view of list shown below.

|  | level | stored? | initial | insert | remove | view |
|---|---|---|---|---|---|---|
| start | C | no | scoop | empty | empty | {1,2,3} |
|  | U | yes | {1,2,3} | empty | empty | {1,2,3} |
| Update at C; insert 4, remove 3; leave semantic vector unchanged. This forces a polyinstantiation, and we have to store a 3-tuple for level C. |  |  |  |  |  |  |
|  | C | yes | scoop | {4} | {3} | {1,2,4} |
|  | U | yes | {1,2,3} | empty | empty | {1,2,3} |
| Update at U; remove 1. |  |  |  |  |  |  |
|  | C | yes | scoop | {4} | {3} | {2,4} |
|  | U | yes | {2,3} | empty | empty | {2,3} |
| Update at C; remove 4, keep semantic vector unchanged. |  |  |  |  |  |  |
|  | C | yes | scoop | empty | {3} | {2} |
|  | U | yes | {2,3} | empty | empty | {2,3} |
| Change semantic vector at C to make *initial* static. |  |  |  |  |  |  |
|  | C | yes | {2} | empty | empty | {2} |
|  | U | yes | {2,3} | empty | empty | {2,3} |

*FIG. 8*

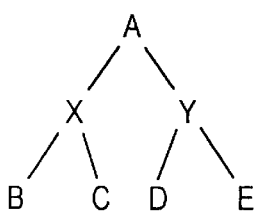

*FIG. 9*

|  | U | James Bond ─┼─ address | M1-6 EMPLOYEES ─┼─ { } | SPECTRE EMPLOYEES ─┼─ James Bond |
|---|---|---|---|---|
|  | S |  | James Bond | { } |
|  | T |  |  | James Bond 007 - infiltrator |

SECURE MULTILEVEL OBJECT ORIENTED DATABASE MANAGEMENT SYSTEM

STATEMENT REGARDING FEDERALLY SPONSORED RESEARCH OR DEVELOPMENT

This invention was made with government support. The U.S. Government has certain rights to this invention.

CROSS-REFERENCE TO RELATED APPLICATIONS

A claim of priority is made to U.S. provisional patent application Ser. No. 60/015,322 now pending entitled TOP SECURE ODBM, filed Apr. 12, 1996.

BACKGROUND OF THE INVENTION

The need for protection of electronically stored data has been recognized since the advent of computer databases. At present there is a need to electronically store and manipulate vast amounts of data, and it is inevitable that some sensitive data will be stored electronically. At the same time, many of databases containing sensitive data are likely to be accessible through a computer network or internetwork, thereby exposing those databases to entities which may attempt to compromise the confidentiality of the sensitive data.

Various techniques are known for providing security for sensitive data. For example, password protection and access lists of users having permission to access a particular piece of data may be employed to prevent unauthorized retrieval of the sensitive data. However, even the denial of access to particular data provides information to those entities attempting to compromise the confidentiality of the sensitive data. A "cover story" of false data is therefore provided rather than denying access. This and other complications related to secure databases have lead to the so called *-property (star property) standard which includes specifications for database security.

A number of secure databases, both *-property compliant and non-compliant, have been developed. Most early attempts to provide secure databases employed relational database technology, but more recently object oriented databases have been favored because of their inherent advantages including encapsulation and inheritance. However, some of the problems associated with relational databases remain. For example, polyinstantiation resulting from entering and updating data still compromises the integrity of known secure databases. While methods are known for lessening the effects of polyinstantiation, these methods tend to reduce the level of confidentiality of the sensitive data, i.e., the databases become less secure. As a result, known secure databases often represent a compromise between data integrity and data confidentiality. It would therefore be desirable to have a secure database with both data integrity and data confidentiality.

BRIEF SUMMARY OF THE INVENTION

The multilevel object oriented database management system of the present invention provides both data integrity and data confidentiality. More particularly, an access validation monitor, semantic vectors, multilevel objects and deletion techniques are employed to manage object creation, update, access and deletion in a manner which optimizes data integrity and maintains confidentiality.

The access validation monitor (AVM) is employed to prevent accidental polyinstantiation, to enforce mandatory and discretionary access to control, to construct views of objects that are suitable for the clearance of the requesting application (subject) and to process object update, deletion, and creation requests in compliance with data integrity and confidentiality requirements.

A multilevel object is associated with at most one instantiation and one semantic vector per each security level, and an access control list which maintains discretionary access control (DAC) information for the object. A multilevel object is said to be populated at a level L if and only if it is associated with an instantiation and a semantic vector at said level. A multilevel object is said to be populated at a level L if and only if it is populated at said level or at one or more lower levels. An instantiation of a multilevel object at level L indicates for each property of said object whether that property's value at that level is stored in the instantiation (static) or is stored in a lower level instantiation (scooped). By definition, all properties in the lowest populated level of an object are considered static.

When a multilevel object is fetched on behalf of a subject executing at a level L and said object is visible to said subject at said clearance level, the AVM constructs a view of said object using the instantiations and semantic vectors at level L and those levels below it; for each property at the nearest populated level (L or below), the semantic vector at said level is examined and the value of said property is computed as follows: if said semantic vector indicates that said property is static, the value of the property is read from the instantiation that is associated with said semantic vector at the location where said property is scooped, and its value is determined by examining lower instantiations and semantic vectors of said object. The view at level L of said object is constructed by storing all computed property values in their assigned locations in a memory block of suitable size to construct an image of said multilevel object as it should be observed by said subject. Said image is returned to said subject as the result of the request.

When a multilevel object is created on behalf of subject executing at level L, the AVM generates an object identifier (OID) and creates a multilevel object at that OID and associates a semantic vector with said multilevel object at said level. The generation of said OID depends on the entity integrity (EI) constraints associated with the type of said new object; if said type has EI constraints, the subject must provide an entity identifier (EID) in the object creation request; if said EID is found to match an existing object is returned to the requesting subject, if said existing object is visible at level L tot he requesting subject, an error condition is signaled and the creation fails. If EI constraints are placed on the type of said object, and the EID is not associated with any already existing object, a new OID is generated and a permanent association of said OID with said EID is created and stored in the database, and said OID is returned to the requesting subject. If there are no EI constraints on the type of said new object, a new OID is generated and returned to the requesting subject. In the constraints, the multilevel object at that OID becomes a populated at the level of said subject. In all cases, the requesting subject cannot distinguish whether the returned OID is new or that an existing multilevel object (Only if OID obfuscation is employed. Without obfuscation, it is possible to observe the ordinal sequences of generated OIDs and conclude whether one is being reused or is newly generated).

When a subject executing at level L updates its view of a multilevel object and commits the update, the AVM checks that those properties marked scooped at the level of said subject have not changed from their original value. If said multilevel object is not populated at said subject's level of execution, or if a property at said level is marked scooped in the semantic vector of said multilevel object at said level and has been changed to a new value, than an error condition is signaled, and the update fails. The error condition is called "Accidental Polyinstantiation". To insure that an update to a multilevel object will proceed successfully, a subject executing at level L must: verify that said multilevel object is populated at said level; an AVM command to populate a specified multilevel object at a specified level is available; then verify that all properties which are modified are marked static in said multilevel object at level L; AVM commands to query and modify the state of the semantic vector of a specified multilevel object at a specific property are available.

The semantic vectors thereby obviate the need for redundant storage of object state at each level, and insure that the most recent view of an object is available. Further, since the view construction method at level L does not use information from levels higher than L, confidentiality is preserved.

All operations described above are also subject to discretionary access control (DAC).

BRIEF DESCRIPTION OF THE SEVERAL VIEWS OF THE DRAWING

Other features and advantages of the present invention will become apparent in light of the following detailed description of the drawing in which:

FIG. 2, FIG. 3 and FIG. 4 are diagrams which illustrate multilevel data management;

FIG. 8, FIG. 9 and FIG. 10 illustrate multilevel aggregates and invisible supertypes.

DETAILED DESCRIPTION OF THE INVENTION

Figure 1:
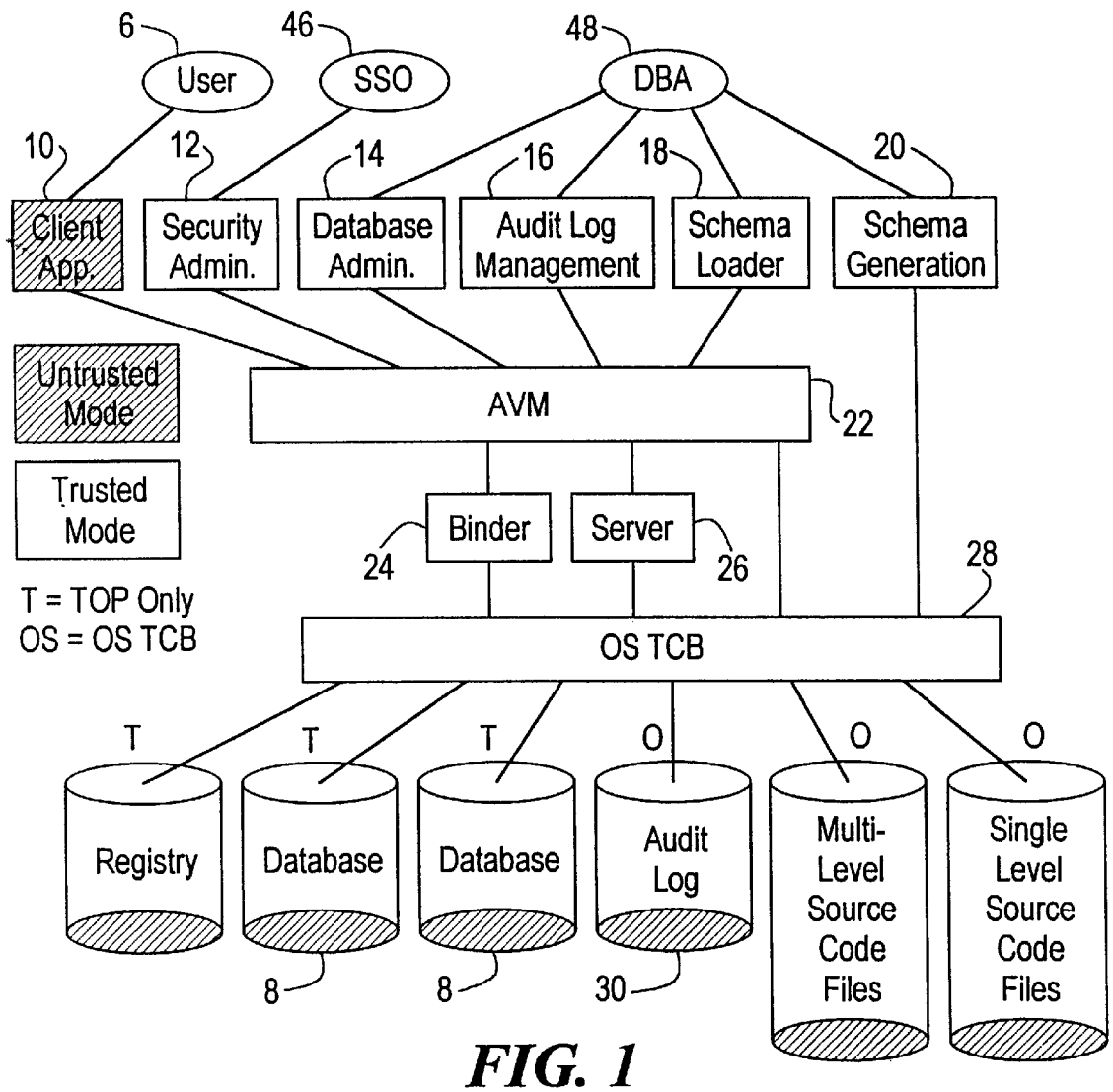
FIG. 1 is a block diagram of a secure data base management system.

Referring now to FIG. 1, the database management system has a plurality of modules through which a user 6 communicates with a database 8. Included in the system are a client application module 10, a security administration module 12, a database administration module 14, an audit log management module 16, a schema loader module 18, a schema generation module 20, and access validation monitor ("AVM") 22, a binder 24, a server 26 and an operating system trusted computing base ("OS-TCB") 28.

The database management system functions to maintain data integrity and data confidentiality while facilitating storage and retrieval of objects on behalf of client applications. Database operations fall into two classes: administration and client service. Administration operations are trusted operations which are performed with trusted agents only, using administration tools to create and configure databases and load schema. Client service operations involve communication between untrusted clients and trusted servers across the TCB interface. Each client application is associated with a security clearance level which may be based upon the identification of the user, the clearance level of the application program, the clearance level of the execution environment, e.g., workstation, network, client site, etc., and the security rules in effect. Storage and retrieval of objects is controlled by rules based upon the clearance levels to maintain a secure database management system.

Each client application 10 communicates with the database 8 through the AVM 22, the TCB 28 interface and two types of TCB services: the binder 24 and the server 26. The binder locates servers for the client and manages sessions between servers and clients. The server manages database object storage and retrieval, and transactions including locking and serialization. The binder and server communicate with client applications through the AVM. The AVM 22 is a trusted interface component which manages security over client/server sessions and insures that requests submitted to servers and data transmitted to clients do not violate security constraints. The AVM communicates with other TCB modules and updates the audit log 30, which provides a record of security relevant events. An audit log reader is an untrusted component of high integrity which is employed to monitor the audit log. The AVM provides the exclusive means of access to the content of the object database by untrusted client applications and security administration and database administration modules. Each untrusted client application communicates with the AVM module via a trusted inter-process communication channel provided by the underlying operating system TCB. This channel provides a means for identifying the security profile of the client application. Ideally, the channel also tags each communication from the client application with an unspoofable identifier. This allows the AVM to cache the client application's security profile and associate it with its identifier for use in future operations.

The AVM contains logic for functioning with multilevel objects and addressing each sensitivity level of an object separately. Addressing individual sensitivity levels of an object is facilitated by the database representation of a multilevel object as a collection of other single level objects which make up its different sensitivity levels. Each instantiation and the multilevel object can be addressed separately by the server 26, while database client applications 10 refer to their sensitivity level view (1-view) of the object. The AVM 22 replicates the interface of the server 26 and the binder 24, filters all client application requests to these services, and pre/post-processes these requests and their responses. Thus, the AVM provides multilevel processing on top of previously available database facilities.

Figure 2:
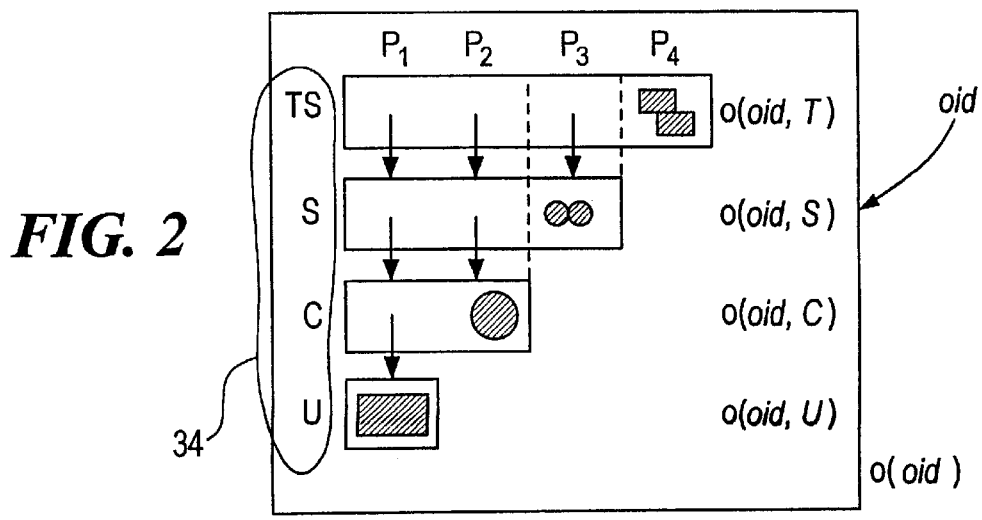

Referring now to FIGS. 2, 3 and 4, multilevel objects 32 are stored according to security level 34. More particularly, each object may include a plurality of 1-views existing at different security levels. Exemplary security levels 34 include "unclassified — U," "classified — C," "secret — S" and "top secret — TS." In order to access a particular 1-view while traversing an object, the client application must have a security profile clearance level equal to or higher than that of the 1-view. Further, in accordance with the *-property, an 1-view created or updated by a particular client application must have a security level which is at least as high as that of the client application creating or updating the data. Also, writing data "down" to lower security levels and reading data "up" from higher security levels is prohibited.

As shown in FIG. 4, multilevel objects may be stored according to both compartment 36 and security level 34. Exemplary compartments include "Army," "Navy" and "Air Force." In this configuration the object may have different 1-views in different compartments at a given security level. In order to access a particular l-view while traversing an object, the client application must have a security profile clearance level equal to or higher than that of the 1-view in addition to permission from the compartment in which the view resides.

Multilevel objects are represented as instances of a C++class OC_MultiLevelObj, which implements two vectors of N references each, where N is the maximum number of supported security levels. A first vector contains references to the 1-instantiations of the object and a second vector contains references to the corresponding semantic vectors. Object types are indicated via a contained reference to an OC_Type object stored in the database. The contained reference is an object identifier ("OID") value, and multi-level objects are all one type. 1-instantiations have various system-defined and application-defined types, but the various 1-instantiations of a multi-level object will have the same type. In the context of a schema that contains cover stories, the 1-instantiations may logically reference different 1-views of the same multi-level type object. Typically, however, the 1-instantiations simply reference a single-level type object.

Each 1-instantiation is only referenced by the multilevel object associated therewith, and all other references are made through the OID of the multilevel object. Following such a reference in the context of a client at a given level will result in production by the AVM of a correctly-typed 1-view object derived from the state of the dominated 1-instantiations of the multi-level object. For security reasons the existence and structure of the multilevel object is normally restricted to the AVM and Trusted Path operations. Multilevel objects thus add an extra layer of indirection between an object's identity, as used by references to the object, and the object's state, as it is represented, labeled and stored.

Figure 5A:
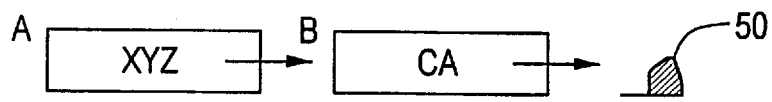
FIG. 5A, FIG. 5B, FIG. 5C, FIG. 6 and FIG. 7 are multilevel database diagrams which illustrate scooping and semantic vectors.
Figure 5B:
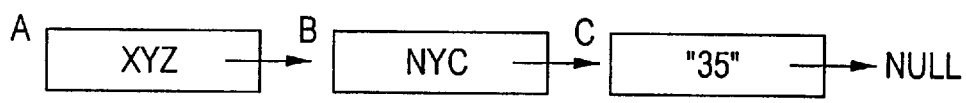
Figure 5C:
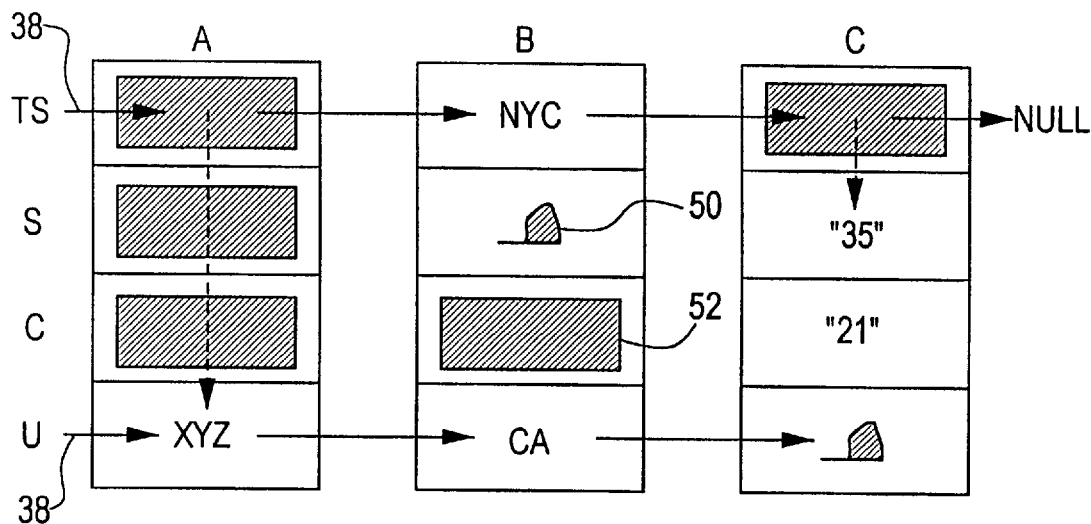
Figure 5C:
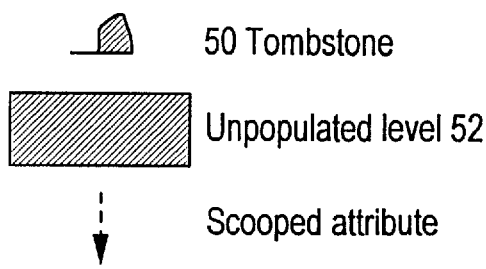

Referring now to FIGS. 5A, 5B, 5C, semantic vectors 38 are utilized to control object traversal. More particularly, the semantic vectors 38 direct the construction of appropriate 1-views 40 of the traversed objects (here A, B, C) while obviating the need for redundant data storage at each sensitivity level. For example, when an exemplary client application executing at Top Secret is directed to traverse the linked sequence of objects starting at the object A, said application would traverse the sequence A: (x=XYZ, next=B), B: (x=NYC, next=C), C: (x=35, next=NULL The value "XYZ" is observed at Top Secret and is stored at Unclassified only. In object B, the value NYC is observed at Top Secret, and is stored at Top Secret, and the semantic vector for said attribute at said level marks it static; thus, although at level Secret object B is tombstoned 50 and appears deleted (a cover story), it can be observed at Top secret. Also, at level Confidential, attribute x of object B appears as "CA"; since level Confidential of the object is unpopulated 52 (i.e.: there is no instantiation at level Confidential in object B, and there is no semantic vector at said level in said object) the view at said level is, by definition, the view at Unclassified, Note that level Confidential of object B consumes no storage although there exists a Confidential 1-view of object B.

From object B, sad exemplary application, executing at Top Secret, would issue a request to fetch object C, by activating the reference obtained from the attribute next of object B. Object C appears to hold the value "35" in the attribute x when observed at Top Secret; said value is placed in the view in the AVM during the construction of the Top Secret view of the object C; the Top Secret view is identical to the Secret View, since the Top Secret level is not populated in object C whereas the Secret level is and is the nearest (to Top Secret) populated dominated level of object C. The reference in attribute next in the Top Secret view of C is to Null. the semantic vector at level Secret in object C marks sid attribute as scooped, thereby directing the AVM to looking in the nearest dominated populated level of object C in which said attribute is marked static for a value of said attribute.

Thus, scooping obviates the need for storing every view at every visible level, thereby avoiding unnecessary redundant data storage. Semantic vectors summarize object layout and pointer locations and specify the method by which each attribute value of an object is calculated: a property value is either scooped (stored in a dominate instantiation of same object), or static (stores in the instantiation associated with the semantic vector).

Figure 6:
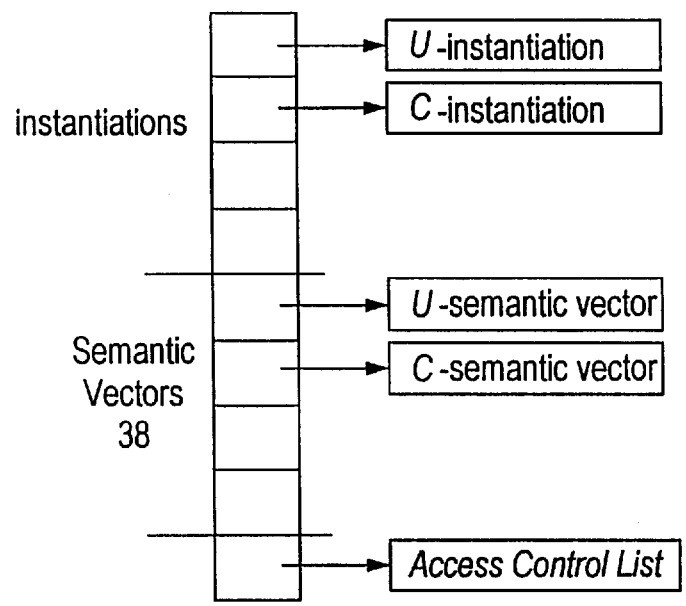
Figure 7:
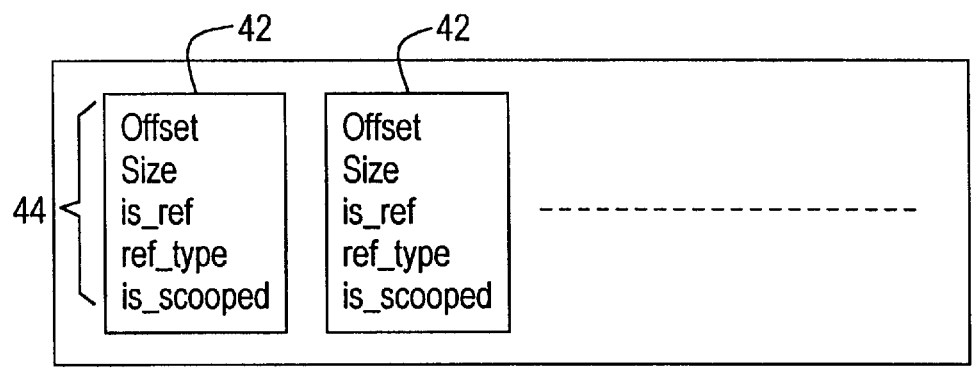

Referring now to FIGS. 5–7, the representation of semantic vectors 38 can advantageously be manipulated without requiring full object activation. Each semantic vector is a vector of semantic vector cells 42, including one cell for each property 44 of the type which the vector represents. Each semantic vector cell includes the following information: offset of property, size of property, a boolean indicating whether the property is a reference, reference type (in case property is a reference), and boolean information indicating whether a property value is derived by dynamic-read-down. Two reference types are provided: strings and persistent objects (objects with identity). The 1-views are constructed from one or more 1-instantiations of a multilevel object using the semantic vector information. Semantic vectors are identical for all instances of any given type, except for booleans which indicate use of dynamic-read-down. To minimize impact to the server processes, the AVM passes these "components" to and from the server in an OC_TransObj form.

The AVM routine for deriving 1-views from multi-level objects and their components is as follows:

```
Input: OID, level
Output: Instance of OC_TransObj representing the 1-
view at the requested level.
    // test for attempts to gain unauthorized access
    assert(level is dominated by subject level)
    obj := getObjFromServer(OID)
    // single level objects can be directly stored and
retrieved
    if (not (type (obj) ==OC_MultiLevleObject))
        return obj
    //Find highest and lowest instantiations dominated by
requested level.
    For each L:= level down to database_low
        if(obj,instantiation[L] is not null) then
            if(HighestNotYetFound) then Highest:= L;
endif
            Lowest = L
        endif
    endloop
    assert (HighestHasBeenFound)
    create unresolved_prop_list (empty)
    if (Highest != Lowest)
        sv:=
getObjFromServer(obj.semantic_vector (Highest))
        For each property P of
obj,instantiation[Highest]
            if(sv.cell[P].is_dynamic) then
                add P to unresolved_prop_list
            endif
        endloop
    endif
    //If all properties are static (or highest==lowest),
we're done
    if(unresolved_prop_list is empty)
        result:=
getObjFromServer (obj.instantiation[Highest])
    else
        result:=
        make AndCacheAnLViewAsACopyOf
        (getObjFromServer(obj.instantiation[Highest]))
    //Now, we try to resolve each property individually
    //We test down to Lowest+1. At the lowest level, the
semantic vector is
```

-continued

```
    //assumed to be static.
        For L:= Highest-1 down to Lowest+1
            inst := getObj (obj.instantiation [L])
            inst_sv:=getObj (obj.semantic_vector[L])
            For each element P of unresolved_prop_list
                if(not inst_sv.cell[P].is_dynamic)
then
                    result.property_value[P]:=
                    inst.property_value[P]
                    remove P from
unresolved_prop_list
                endif
            endloop
        endloop
        if(unresolved_prop_list is not empty) then
            inst:= getObj (obj.instantiation[Lowest])
            For each element P of unresolved_prop_list
                result.property_value[P]:=
                inst.property_value[P]
                remove P from unresolved_prop_list
            endloop
        endif
    endif
    result.selRef:=OID//make instantiation look like it
is the object at the request OID.
    assert(unresolved_prop_lsit is empty)
    return result
```

Referring again to FIG. 1, the AVM 22 prevents polyinstantiation by matching existing object 1-views with newly created views of the same object. An update event occurs when the client application 10 issues a flushObj command to the AVM. The updated state of the object is then passed as an OC_TransObj. The original state, produced by view construction, is cached in the AVM and is thus available for comparison with the newly submitted state. An update routine compares the newly submitted state to the original state at properties that are marked for dynamic-read-down in the current semantic vector, and insures that only static properties are updated. In accordance with the *-property, updates are allowed only at the subject's security level, and therefore require no security level input.

The update routine operates as follows:

```
Input: obj (newly submitted state)
Output: none
    subj_level:=getSubjectLevel();
    subj_user:=getSubject () ; //get current subject's
user.
    OID:= obj.selfRef
    mlobj:=lookup (OID)
    //validate request: check for attempts to write
    at system-low from above.
    if(mlobj is not multilevel and subj_level >0)
then
            raise error condition // single level
            objects are read-only for high subjects
        endif
    // validate request: check for DACt
    if(not(has_access(update_obj, mlobj, subj_user)))
then
            raise error condition // permission violation.
        endif
    //validate request
    if(mlobj is not instantiated at subj_level) then
            raise error condition // cannot update at an
            unpopulated level
    endif
    // Check special cases
    // 1. level 0 can update single level objects.
    if(mlobj is not multilevel) then
            commit obj
            return
    endif
```

```
    //2. lowest populated level is always static
    // so, we simply update the instantiation.
    if(lowest populated level(mlobj)== subj_level) then
            obj.selfRef:= mlobj.instantiation[subj_level] //
            restore the OID of the instantiation
            commit obj
            return
    endif
    // General case
    sv:=lookup_sv(OID)// cached from view construction
phase.
    old_obj:= get_cached_view(OID) // original state.
    For each property P defined on obj
            if(sv.cell[p].is_dynamic) then
                if (not (old_obj.property_value [P]==
                obj.property_value [P]))
                    raise error condition // attempt to
                    update lower-level value
                endif
            endif
    // At this point, we know that no errors were
detected, and that the multilevel object is populated at
the subject level.
    obj.selfRef:= mlobj.instantiation[subj_level] //
restore OID of instantiation
    commit obj
    return
```

If the multilevel object was not populated at the subject level during view construction, the client must first issue an add_instantiation request and semantic vector update requests for those properties that are to be modified in the update request.

Object creation requires create_obj permissions. Newly created objects are given a default Access Control List ("ACL"). Typically, the default ACL grants the creator of the objects all rights to the objects, and grants control rights over the object to a System Security Officer ("SSO") 46 and a Database Administrator ("DBA") 48. Object creation requires two requests: (1) new object identifier, and (2) create a new multilevel object of a client specified type at the new identifier. In response the AVM creates an OC_MultiLevelObj with a semantic vector at the subject level. The newly created object will be instantiated at only one level, the subject level, which will result in its treatment in one of the special cases of update processing.

Referring to FIGS. 2 and 3, under Entity Integrity constraints which are imposed on selected types, generated OIDs may refer to objects which are not visible at the calling subject's level. Without obfuscation it would be possible to infer the existence of such objects by monitoring the changes in OID sequences (segment number). OID obfuscation, which minimizes the information content of observed OID values and renders them time-sensitive, addresses this problem. Obfuscated OIDs lose meaning outside the transaction in which they are observed.

To avoid negative interactions between type correctness and security concerns, type tags are attached to entity identifiers. That is, given an object of type T and an entity identifier E, the effective entity identifier of the object is <T,E>. The association between an effective entity identifier and an OID becomes persistent when the object is flushed from the subject and committed.

Referring to FIGS. 5A, 5B and 5C, the AVM also controls 1-view deletion. Since object deletion updates the state of the database, observation of object deletion is not allowed below the level at which the deleting subject is executing. Furthermore, if there are instantiations above the deletion level, then the deletion is potentially a cover story. Therefore, the effect is not automatically cascaded upwards either. Importantly, object deletion is indistinguishable from a complete object deletion for an untrusted user.

The level at which an object is deleted is marked by a token deletion referred to as "tombstone" 50. During object deletion, if there are no other instantiations for the object, the complete object is deleted. However, if other instantiations exist below the deletion level, those instantiations continue to remain visible at their respective levels. Further, if other instantiations exist above the deletion level, those instantiations also continue to be visible at their respective levels, and any values scooped from the deleted instantiation are written upwards to maintain the coherence of such views. Uninstantiated levels of the object thus appear deleted if their views are constructed from a tombstone 50.

During maintenance and cover story/polyinstantiation reconciliation it is possible to "revive", an object by removing the tombstone 50 and entering an l-instantiation in place of the removed tombstone. Because there is a need to maintain the appearance of complete object deletion, references that appeared obsolete (pointing to a deleted object) continue to appear obsolete. Otherwise, untrusted subjects might infer the existence of such higher instantiations. To insure this result, both references and the complete object at each level are annotated with incarnation numbers which are invisible to the untrusted client.

An exemplary multilevel aggregate system is illustrated in FIG. 8. An l-view is a full-bodied aggregate object which is constructed using an l-instantiation. An l-instantiation is an object which, when coupled with lower level instantiations (or views) and its semantic vector provides sufficient information for constructing an l-view. The l-view of a T-typed object is an instance of class T, whereas an l-instantiation of such an object is not constrained in this manner. The following is therefore employed: (1) at level 1' where dom(1', 1), the aggregate is always identical to the one at level 1 (traditional scooping); (2) at level 1', where dom(1', 1), the aggregate membership information is a modification of the level 1 information; and (3) at level 1', where dom(1', 1), the aggregate is independent of lower levels (traditional static).

Referring now to FIGS. 8, 9 and 10 the management system also provides models for handling aggregates. Aggregates are object groupings that provide a convenient means of storing and manipulating either ordered or unordered groups of objects. For example, Lists are ordered unkeyed Aggregates that represent linked lists, sequences, queues, or stacks. Lists store members serially, and each member in a list has a position in the List. Insertion into the List at a particular position increments the position of all members following that position. Removal of a member does the opposite. A Set is an unbounded, unordered Aggregate. Set members can be inserted, removed, and tested for membership. Unlike other Aggregates, Sets do not support multiple entries for the same member. All members of a set are unique. An Array is an Association Aggregate whose keys must be the continuous range of integers between specified lower and upper bounds, either of which may be positive, negative, or zero. All of the elements of the Array are allocated and initialized to NULL. The cardinality of the Array is the number of distinct values in the range from the lower bound to the upper bound. A Dictionary is also an Association Aggregate. Keys or tags for a dictionary can be userdefined, rather than being a continuous range of integers, can be user-defined. A Dictionary instance's tag can associate one object to one or more other objects supporting associative lookup. Dictionaries are unrestricted in size and may be ordered or unordered.

An important aspect of security is visibility of "membership" information. More particularly, although an object X and an aggregate A may both be visible at some level 1, the fact that X is (or is not) contained in A may be classified at a higher level. By way of further example, the record on "James Bond" may be visible at level U, and at level U we can see a set of "MI-6 employees". However, the fact that Bond works for MI-6, i.e., is a member of the employee set, should be visible only at level S or above. Further, if "SPECTRE" membership is tracked in another set, and Bond infiltrates SPECTRE, it may be preferable that the Bond record appear in that set at level U, but be absent at level S or above. The fact that Bond is infiltrating SPECTRE may be classified T so that the Bond record appears in both sets (annotated to avoid the appearance of treason, of course). Such invisible supertypes help to preserve data confidentiality.

In the database management system aggregates are treated as atomic objects when a list or array is employed. Under this model, an l-instantiation is a full-bodied aggregate. That is, if the semantic vector at 1 indicates that the aggregate is static, then the 1-view for that 1-instantiation requires no information from lower levels of visibility to provide membership information. A scooped 1-view is computed from the "highest" dominated m-instantiation when m exists. As with other atomic types, e.g., integer, the value of the object is fully stored at one cell, not collected from different cells at possibly different levels of visibility. Instantiation at a level implies a complete separation from the lower level. This implementation provides view consistency. Assuming updates do not violate the invariance of the applications using the aggregate, then any 1-view whether scooped or static is constructed from a complete and correct aggregate object. The implementation also provides simplicity and efficiency because implementation is uncomplicated. Further, view construction is also simple and efficient since there are no transformations from an instantiation representation to an aggregate object.

The 1-instantiation for a set is represented as a 3-tuple <initial, insert, remove>. "Initial" is the initial state of the set, which can be scooped. The scooped value is computed by constructing the lower level view. "Insert" is a set of objects which must be in the set at that level, which is static. "Remove" is a set of objects which must be excluded from the set at that level, which also is static. The sets "insert" and "remove" are disjoint, and any or all of the sets may be empty. None of the three sets contain members which cannot be visible at level 1.

A routine is provided for handling unordered aggregates. Membership of an object is represented as a datum, (object), visible at the lowest level where both the object and the aggregate are visible. That is, given:

a: Aggregate; visible at $L_1$ x: Object; visible at $L_2$ existence is assumed for:

in(x, a) : boolean; visible at lub $\{L_1, L_2\}$ For simplicity, these virtual attributes are associated with the aggregate. Also, for any pair (x, a) for which no stored answer exists, in(x, a) is defined to be false. Stored annotations appear when membership data is modified, and the annotation data is made visible at the level of the update. The lowest instantiation of the aggregate is assumed to be a full-bodied aggregate object, or an empty one with a number of explicit annotations. Thus, an l-instantiation can be modeled as <initial state, modifier$_1$ , . . .>; where Initial state is either scooped, i.e., a copy of the lower level view, or static, i.e. (a reference to a full-bodied aggregate), and Modifier$_1$, . . . represents the additional membership information at that level. The modifiers are always static. Using this model, 1-view construction is accomplished with the following routine:

Scoop all the lower level values by copying the lower level 1-view into $a_1$.

For each t=in(x, a) at level 1, if t is false and x is in al, remove it; otherwise, if t is true and x is not in $a_1$, insert it.

The model provides upward data flow of membership information. Membership data at lower levels is seen at higher levels. Multiple options for access control are also provided. It is possible to decouple 1-views by severing the scooping link on initial state. Also, it is possible to maintain sensitive membership information without losing access to the latest lower level information by scooping initial state.

A dictionary model is provided as a set of pairs <key, target> where "key" is a reference to the key object and "targetis" a reference to the object associated with "key". As with sets, a dictionary viewed at level 1 cannot have "key" references to objects which cannot be visible at 1, since this would make it impossible to use the key to place or locate the "target" object. As with sets, 3-tuples are maintained at each level after polyinstantiation. In this case, the sets "insert" and "remove" do not share any pairs with identical "keys". Alternatively, the parts of <key, target> pairs may be polyinstantiated. However, this may introduce "key" or "target" references to objects which are invisible at some levels.

As a further refinement, "key" and "target" can be modeled to provide defaults. This would be used, for example, to provide default non-null targets at particular keys until such information is provided at a lower level. An implementation model for arrays and lists is provided.

Unlike dictionaries and sets, arrays and lists impose positional constraints on their members and make the representation of generalized modifiers difficult. For example, lists and Arrays can be modified at random accessed locations, and have their boundaries shifted. Furthermore, it is not possible to determine the intended meaning of an operation by studying the modifications alone; for example:

```
OC_Array *a =OC_lookup ("MyArray");
int i = a->upperBound();
a->upperBound(a->upperBound() + 10); // expand by 10
// stuff new stuff at end
while (i < a->upperBound ()) {
    (*a) [++i] = new SomethingNew(i);
}
```

Tracking these updates as absolute array indices and then updating the lower level view of the array to a different size, the changes would probably be applied with the wrong meaning. Tracking these updates as updates relative to the head and tail of the array, changes at absolute indices cannot be represented. Additionally, it is not generally possible to determine the programmer's intended meaning by static or dynamic analysis since a programmer may optimize operations and totally obfuscate the intended meaning. Further, lists support expansion and shrinkage at the head, tail, and middle, thus changing the indices of potentially all list members. This would seem to indicate that the representation of modifications in a generally usable fashion is virtually impossible for these two classes. However, with the following variants on OC_List and OC_Array, a practical representation of change may be derived:

1. The list class allows expansion only at the head or the tail, and does not support random addressing (a double ended queue). The allowable operations are:
   insert at head;
   insert at tail;
   remove first member;
   remove last member.

2. The array class has fixed boundaries, and cannot expand or shrink. In this case the data model becomes that of a simple object with a finite number of properties. Different boundaries may be allowed at different levels of visibility, as long as the boundaries never change at all levels.

Note that this model also subsumes lower level C++vectors. In this case, the lower bound is always fixed at 0.

In representing multilevel aggregates, the management system provides several options. One option is an atomic representation at every instantiated level. The construction of an 1-view requires no information from a lower level view, and is not sensitive to changes in the lower level state after polyinstantiation. The technique is general, simple, and applicable without need for special case analysis. However, this technique is too coarse if emphasis is placed on up-to-date access to all visible membership information. In a second option, in addition to total separation between levels, the management system also presents techniques for presenting multilevel aggregates that retain upward data flow of membership information. The techniques are applicable to sets and dictionaries (OC_Set, OC_Dictionary), but cannot be applied to list and arrays (OC_List and OC_Array) because we cannot derive a robust representation of modification for these classes. However, for generalized lists and arrays, only the first option is applicable.

It should be understood that various changes and modifications to the above described method and apparatus may be made without departing from the inventive concepts disclosed herein. Accordingly, the present invention is not to be viewed as limited except by the scope and spirit of the appended claims.

What is claimed:

1. A multilevel object database management system method for a database having levels 0 to N where each successive level from 0 to N exists at a higher level of security, comprising the steps of:

creating a plurality of views within at least one object, said views each existing at a different level of security; and in response to a request by an entity to access the object, determining the security clearance level of the entity;

if a view exists at the determined security clearance level, providing the view existing at the determined security clearance level; and if a view does not exist at the determined security clearance level and a view exists at a lower level of security, providing the nearest existing lower level view, whereby an element of data of a given security level can be accessed by an entity at a higher security level, thereby avoiding wasteful duplicative data storage.

2. The multilevel object management system method of claim 1 including the further step of providing a semantic vector for each existing view, said semantic vector indicating whether the respective view is scooped or static, a scooped view being provided by reading down from a lower level representation, and a static view being defined statically at the security clearance level at which the view exist and being decoupled from lower security clearance levels.

3. The method of claim 1 including the further step of, in response to a request to enter data associated with an object, joining the entered data with any pre-existing, matching object by differentiating the object into a plurality of l-views.

4. The method of claim 1 including the further step of, in response to a request to delete an object, determining whether a plurality of l-views exist for the object;

provided only one l-view exists, deleting the object; and provided a plurality of l-views exist, determining which l-view is associated with the request and marking that l-view with a token which provides an appearance of object deletion at the l-view.

5. The method of claim 4 including the further step of presenting views which are scooped from the token as being deleted.

6. A multilevel object database management system method for updating multilevel objects existing at levels from 0 to N where each successive level from 0 to N exists at a higher level of security, comprising the steps of:

in response to a request to create an object having a view at a given level of security, determining whether said object is already in existence; and if said object is already in existence, matching said request to the object in existence in order to provide a single object having a plurality of views, said views each existing at a different level of security.

7. The method of claim 6 including the further step of determining a sensitivity level associated with the request to create the object, and vectoring actions associated with object creation to an l-view at the determined sensitivity level.

8. A method for implementing deletions in a multilevel object database having levels 0 to N where each successive level from 0 to N exists at a higher level of security, comprising:

in response to a request for deletion of an object originating at a given level of security, marking the level at which the request originates with a token which provides an appearance of deletion.

9. The method of claim 8 including the further step of, if no instantiations of the object exist at levels other than the level at which the request originates, deleting the object completely.

10. The method of claim 9 including the further step of, if instantiations of the object exist at lower levels of security, allowing such lower level instantiations to remain visible at their respective levels.

11. The method of claim 10 including the further step of, if there are instantiations of the object at higher levels of security, allowing such higher level instantiations to remain visible at their respective levels.

12. The method of claim 11 including the further step of writing upwards any values scooped by such higher level instantiations from the marked level instantiation to maintain coherence of such views.

13. The method of claim 12 including the further step of reviving the object by replacing the token with an l-instantiation which, when coupled with lower level instantiations and a semantic vector provides sufficient information for constructing a corresponding l-view.

14. A method of representing aggregates in a multilevel object database having levels 0 to N where each successive level from 0 to N is associated with a higher level of security, comprising the steps of:

providing an initial entry of membership information at a level l;

providing a modification to the level l information at a level l', where level l' is higher than level l.

15. The method of claim 14 including the further step of, where a first object is a member of a first aggregate, providing membership information only at a sensitivity level which is higher than that of both the object and the aggregate.

16. The method of claim 15 including the further step of treating aggregates as atomic objects when an array or list is employed such that, if a semantic vector at a level l indicates that the aggregate is static, an l-view for the associated l-instantiation does not require information from lower levels of visibility to provide membership information.

17. The method of claim 16 including the further step of representing the l-instantiation for a set as a 3-tuple including an initial state of the set, a set of objects which must be in the set at the respective level, and a set of objects which must be excluded from the set at the respective level.

18. A database management system for providing an interface between an untrusted client application with a sensitivity level associated therewith and a database, comprising:

multilevel objects which include instantiations at a plurality of sensitivity levels;

an access validation monitor which associates matching instantiations of objects, whereby polyinstantiation is prevented.

19. The database management system of claim 18 including semantic vectors which direct a traversing client application to an instantiation at a sensitivity level corresponding to the sensitivity level of the client application.

20. The database management system of claim 19 wherein, when no instantiation exists at the sensitivity level corresponding to the sensitivity level of the client application, said semantic vectors scoop an instantiation from a nearest occurring lower sensitivity level instantiation.

21. The database management system of claim 20 including, when a request is made to delete an object at a first level, a tombstone token which replaces the l-instantiation occurring at the first level in order to provide an appearance of object deletion at the first level.

* * * * *